March 22, 1966  M. MAUL  3,241,664
SORTING MACHINE FOR RECORD OR DATA CARRIERS
Filed Nov. 15, 1962  15 Sheets-Sheet 1

March 22, 1966  M. MAUL  3,241,664
SORTING MACHINE FOR RECORD OR DATA CARRIERS
Filed Nov. 15, 1962  15 Sheets-Sheet 2

March 22, 1966 M. MAUL 3,241,664
SORTING MACHINE FOR RECORD OR DATA CARRIERS
Filed Nov. 15, 1962 15 Sheets-Sheet 5

March 22, 1966 M. MAUL 3,241,664
SORTING MACHINE FOR RECORD OR DATA CARRIERS
Filed Nov. 15, 1962 15 Sheets-Sheet 8

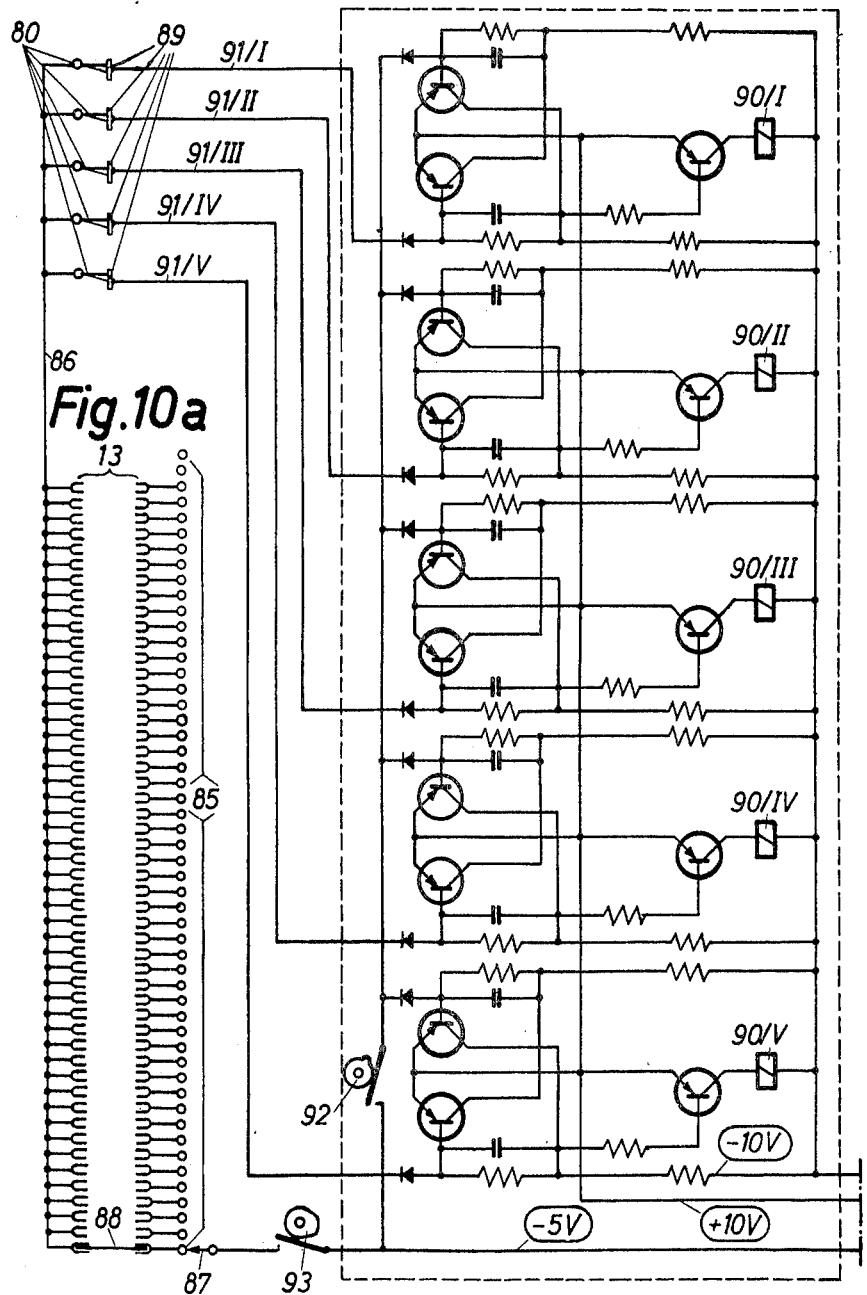

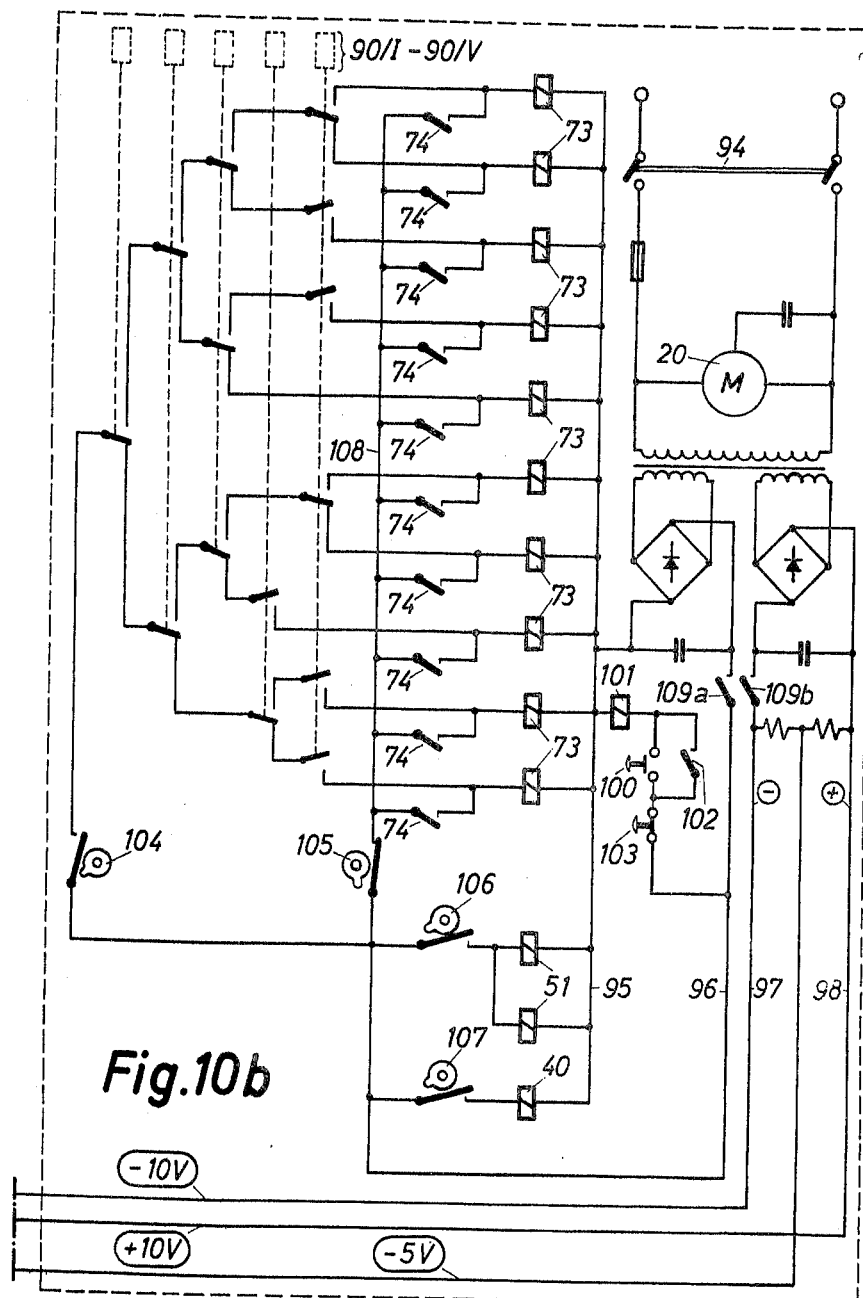

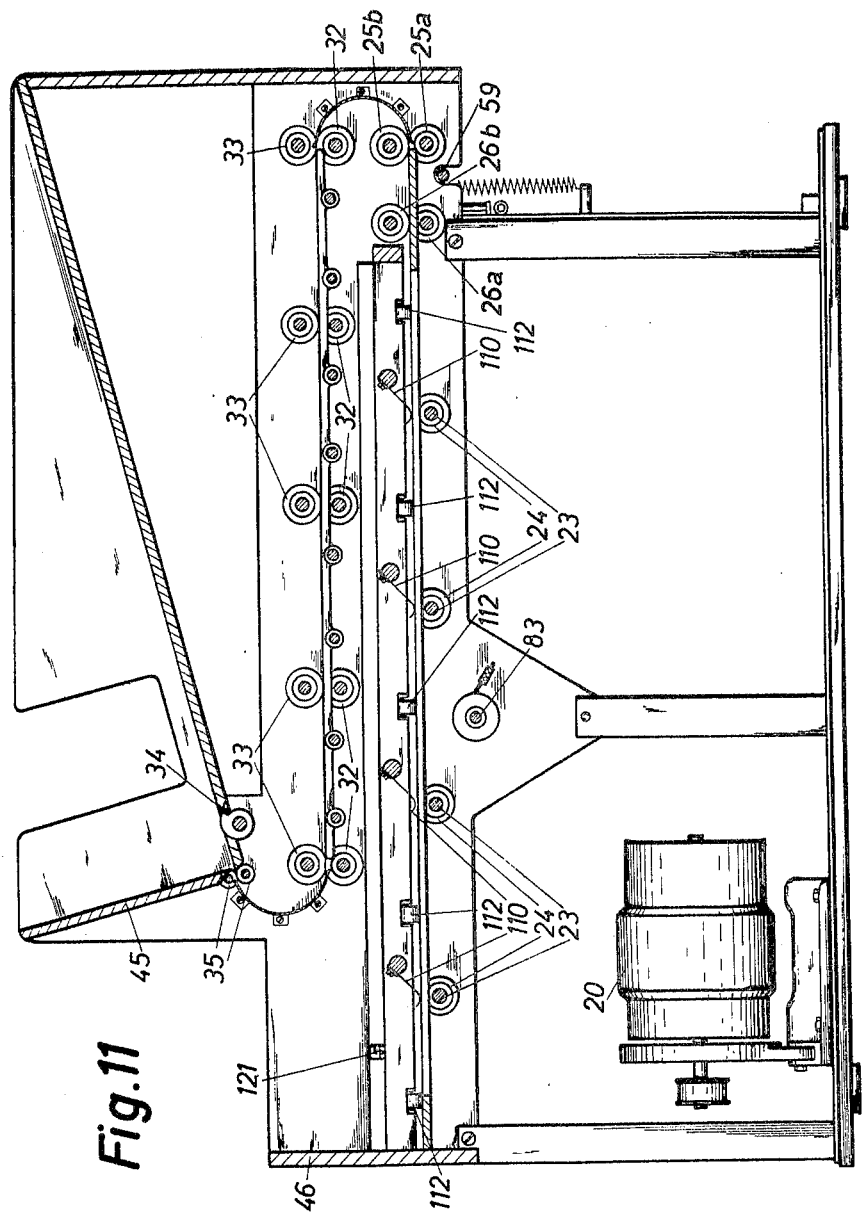

March 22, 1966 M. MAUL 3,241,664
SORTING MACHINE FOR RECORD OR DATA CARRIERS
Filed Nov. 15, 1962 15 Sheets-Sheet 12

March 22, 1966   M. MAUL   3,241,664
SORTING MACHINE FOR RECORD OR DATA CARRIERS
Filed Nov. 15, 1962   15 Sheets-Sheet 14

United States Patent Office 3,241,664
Patented Mar. 22, 1966

3,241,664
SORTING MACHINE FOR RECORD
OR DATA CARRIERS
Michael Maul, Schwabach, near Nurnberg, Germany, assignor to Siemens & Halske Aktiengesellschaft, Berlin and Munich, Germany
Filed Nov. 15, 1962, Ser. No. 237,973
Claims priority, application Germany, Nov. 25, 1961, M 50,989
11 Claims. (Cl. 209—74)

The present invention relates to sorters for punched record media and its object is to make it possible to sort punched tape cards by machine and to permit machine sorting even if punched tape cards of different lengths are to be fed through the machine in one sorting operation.

The record media known as punched tape cards are a special form of the punched cards used as record media. They differ from punched cards in particular by the ratio of the lengths of the sides in that the punched tape cards are narrower and longer than the customary punched cards and therefore can be considered tapes. The columns of holes are in this case arranged alongside of each other in the longitudinal direction of the tape, in the same way as in a teleprinter punched tape. Such punched tape cards can be obtained independently of or in combination with teleprinters and they can also serve in turn to control teleprinters or computers. In the same manner as punched cards, they contain data in the form of holes which can be evaluated by machine. As compared with the ordinary punched cards of standard size (and therefore constant number of columns), the punched tape card system has the advantage that the length of the card (and thus the number of columns for the data to be included) can be adapted in each case to the existing organizational requirements. Therefore, it is not necessary either to have a needless additional number of columns, nor need one business transaction be distributed over several punched cards in a manner which is generally rather unsuitable for organizational purpose if the number of columns in the customary standard punched cards is not sufficient. It may occur in practice that up to 240 columns are needed for a given business transaction, for which would have to be used more than three individual standard 80-column punched cards, since in such case at least one identification item must be repeated on each card. It is in many cases impossible for reasons of the organization of the business to effect such a splitting up of the data over several separate punched cards. In the case of the punched tape card system, however, for the same business transaction there is required only a single punched tape card having 240 columns in which the identification item is contained only once and all related data are contained on a single data medium.

It is now generally customary in machine data processing that the data media are arranged in accordance with characteristics which may differ in each case (for instance order number, article number, etc.) and then be evaluated in the corresponding sequence. The same necessity is present in the case of punched tape cards. Up to now, due to the absence of other possibilities, this is being done either manually in accordance with the sorting concepts which are entered not only as holes, but also in clear text, or sorting can be effected by means of special edge punchings (which must therefore be applied in addition)—by so-called "needle" sorting. In both cases, we are therefore concerned with a manual sorting method.

The present invention now creates the possibility of sorting the punched tape cards by machine, even when the successive punched tape cards are of different length. This occurs, as a matter of fact, in punched tape card systems when the cards of different organizational operations are mixed together—as is also the case in the ordinary punched card method. Of course, the same sorting concepts must be arranged in the same card field, for example, at the same distance from the one end of the tape (for instance the left end, which can be termed the head end of the tape), on the cards of different length.

In accordance with the present invention, machine sorting of punched tape cards is obtained in the manner that the punched tape cards, which may be of different tape length lie in the magazine with their one narrow side aligned with each other, are withdrawn from the stack of cards with the narrow side toward the front, and are conducted by the card carriage to card bins in which, even in case of different tape lengths, the punched tape cards lie with the narrow edges, which were foremost during the removal, located one above the other and with all of these narrow edges in a common plane, both in each bin and also with respect to each other, in the different bins.

The punched tape cards are preferably fed from the magazine by a conveyor (longitudinal conveyor) with the narrow side toward the front to such an extent into a rerouting station that the front narrow edge of each card comes always into the same position, regardless of the length of tape, and that the punched tape cards are fed from the rerouting station with their long sides toward the front toward another conveyor (transverse conveyor) which brings it to the individual sorting bins so that the head ends of the cards lie in alignment, one above the other, in the sorting bins on the card removal side of the machine, regardless of the length of the individual cards in a sorting bin.

In this way, there is obtained in particular a rather compact design of the machine, and the disadvantages which result upon conveyance only in longitudinal direction or only in the transverse direction of the cards are avoided. If it were desired to convey the cards in longitudinal direction from the magazine to the sorting bins, an extremely long machine would result since it would be necessary to provide eleven sorting bins for the ten digits plus one reject bin and, for practical conditions, one can count on a maximum card length of about 24 inches. If the cards were removed from the storage container with their wide sides toward the front, particular difficulties would result in connection with the advancing of the cards out of the storage container. Since the cards within a stack may be of different lengths and the withdrawing device for the cards, for instance card knives, would have to extend over the entire width of the storage container, the difficulty arises here that with cards of different length, not only the bottom short card, but also the longer card lying above it is also taken up by the knives and pushed to a given length, in which the two cards do not coincide, through the card chute. This and a number of other difficulties are avoided by the present invention. Although the cards are withdrawn in longitudinal direction from the magazine, they nevertheless lie in such a manner alongside of each other in the sorting bins that a small length of the sorting machine results, and the stacks of cards lie with the long side of the cards alongside of each other, and the narrow edges of the stacks of cards are on the card removal side of the machine in a single plane.

The sensing of the punched column in accordance with which sorting is to be effected can be effected either while the card is moving longitudinally or when the card is conveyed with the long card edge toward the front. In the embodiment provided with a rerouting station, the sorter sensing device is provided in the first case in front of the rerouting station, and in the second case behind the deflecting station. Two different embodiments thus result with respect to the position of the sorter sensing device, which embodiments will also be discussed herein.

In one embodiment, the card, during its longitudinal travel from the storage container to the rerouting station passes column-wise a sensing device provided for only one column. The sorter sensing device is therefore arranged stationary, and in synchronism with the passage of the punched columns past the sorter sending device, the latter can be made active for a given punched column when the same is just below the sorter sensing device. A sorter flap is opened, corresponding to the result of the sensing. The card, after complete sensing, is in the rerouting station and is transferred from there to the transverse conveyor which conducts the card to the sorter bin corresponding to the punched holes.

The embodiment can however also be of such a nature that the card is sensed by the sorter sending device in back of the rerouter station. In this case, the selecting of the sorter column can preferably be effected in the manner known from punched card sorting machines by local adjustment of the sorter sensing device to the desired sorting column. Accordingly, in the second embodiment of the invention which will be presently described, the punched tape card, after it has left the rerouting station, and therefore with its broad side in front, is conveyed past the sorter sending device which comprises either a single sensing member (for instance a brush) or a plurality of sensing members (for instance a set of brushes) with one member per punch position. The sorter sensing device is made active for any desired punched column by local displacement in longitudinal direction of the card.

The above mentioned two embodiments are shown schematically in the drawings. Of course, these embodiments can be modified in various ways, and many components can also be replaced by equivalent components or components of similar action, such as, for instance, replacement of the card knife by rubber rollers for advancing the cards, replacement of the sensing brushes by photoelectrically-acting sensing members, replacement of the sorting flap in each bin by switches lying one above the other in known manner which terminate one above the other, and the ends of which are controlled by sorting magnets, and in particular the rerouting station can be made in the most varied manners.

Figure 6:
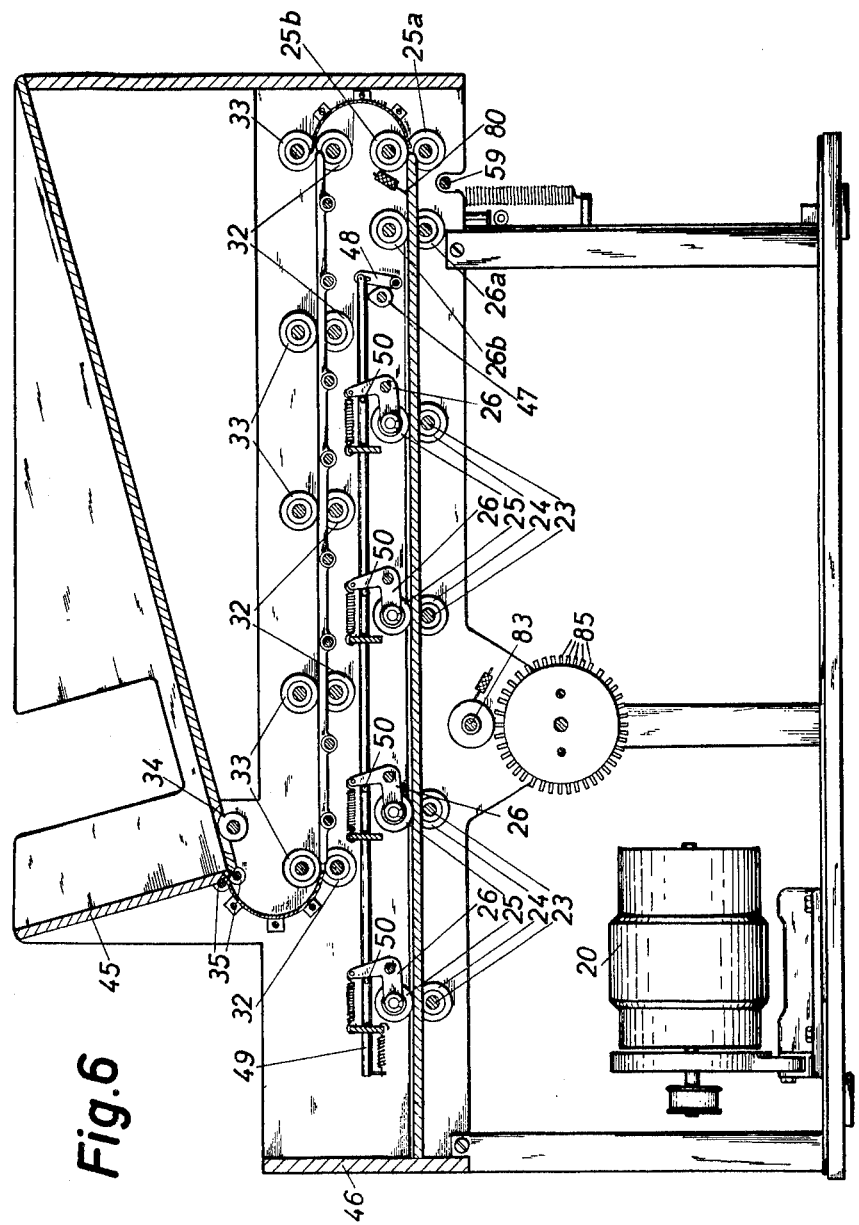
FIG. 6 is a section through the machine as seen along the line 6—6 of FIG. 4.
Figure 7:
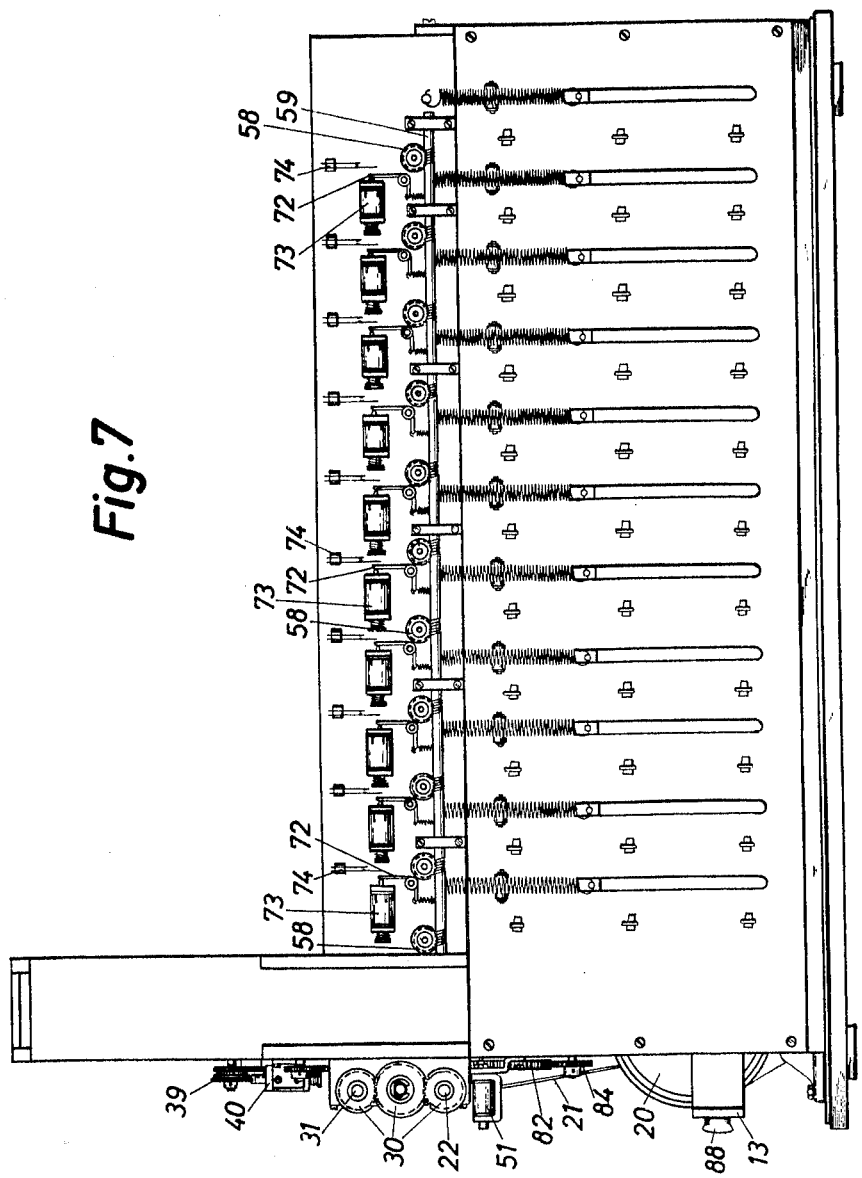
FIG. 7 is a rear view of the machine as seen along the line 7—7 of FIG. 4.
Figure 8:
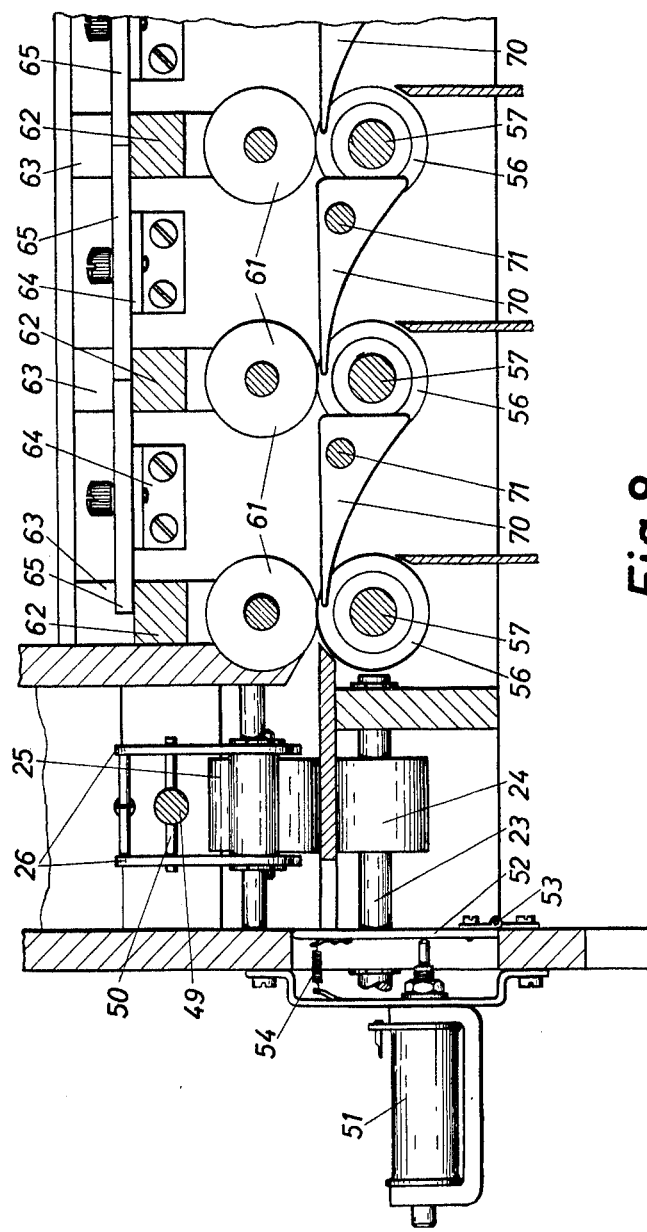
FIG. 8 shows, on a larger scale, a section through the rerouting station and the first feed rollers to the sorting bins.
Figure 12:
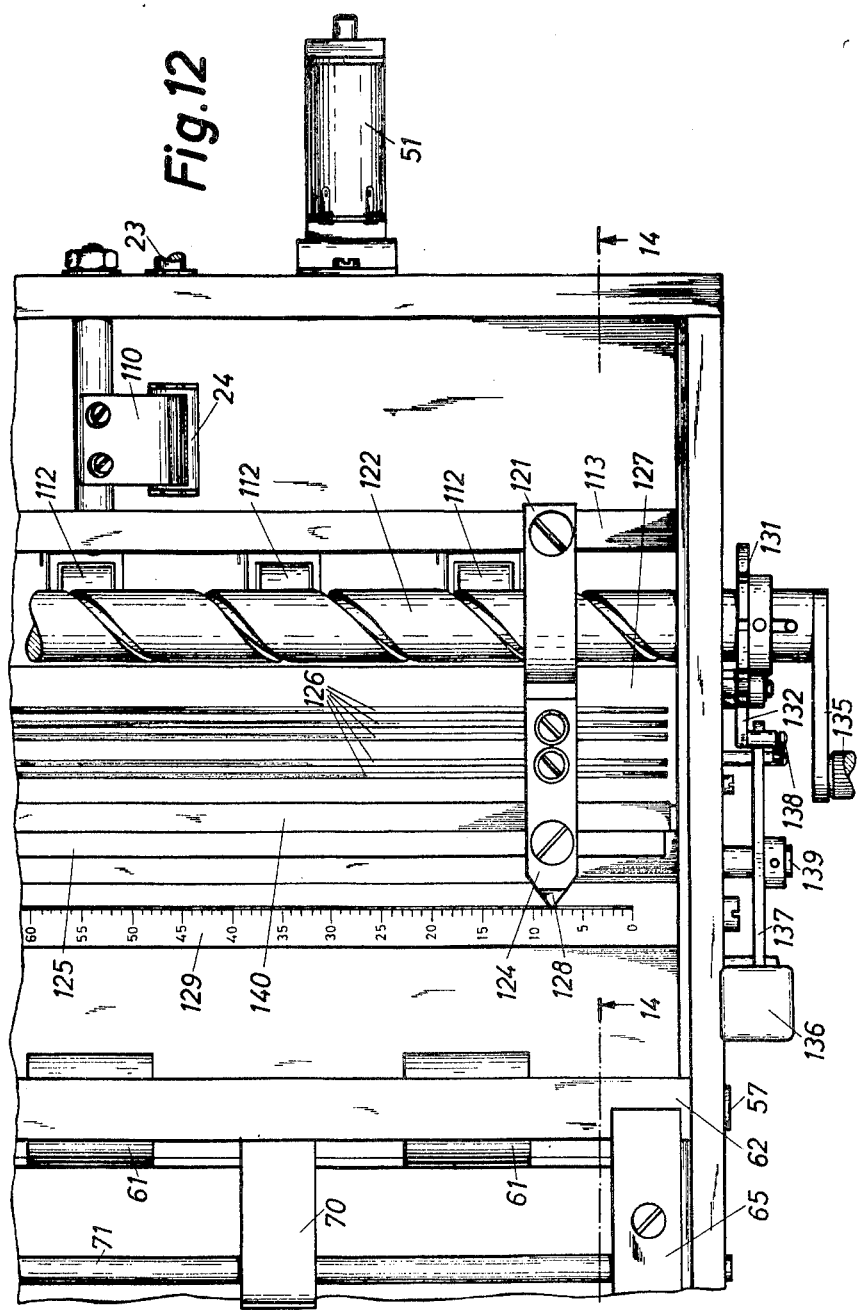
Figure 13:
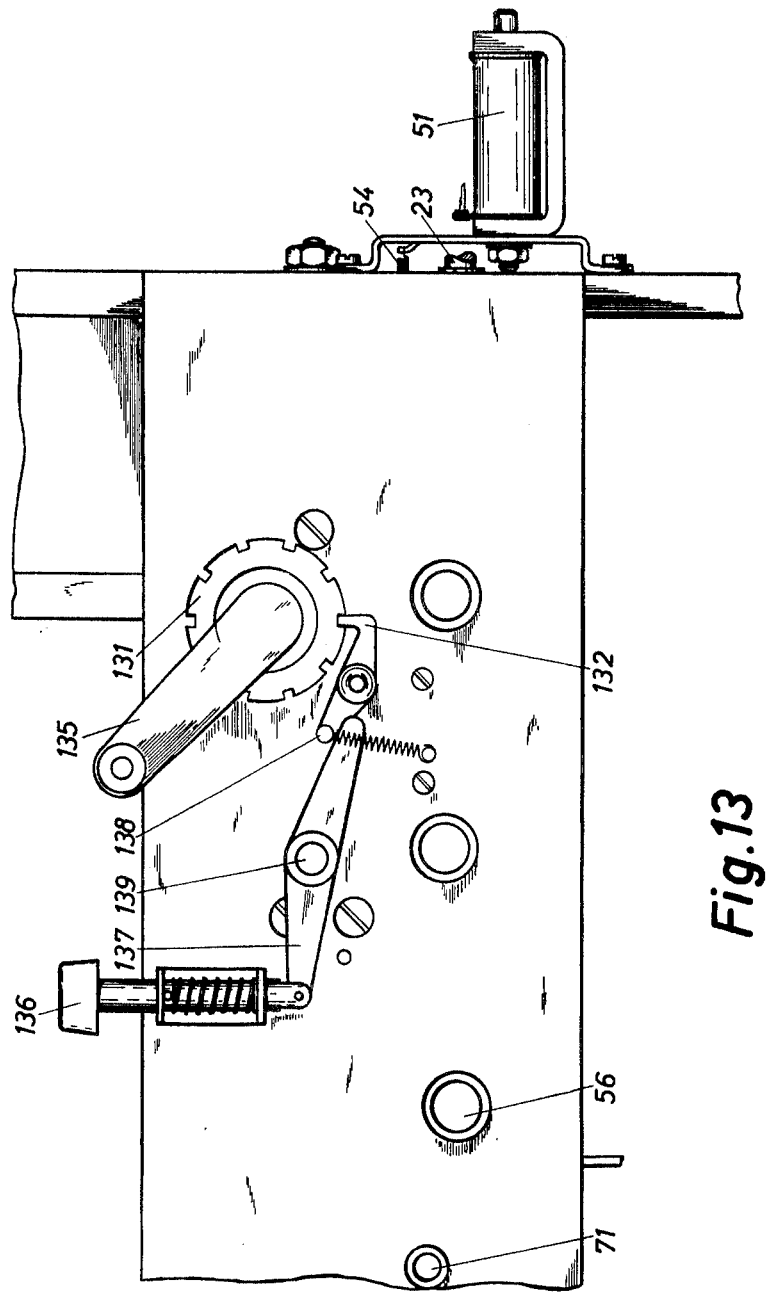
Figure 14:
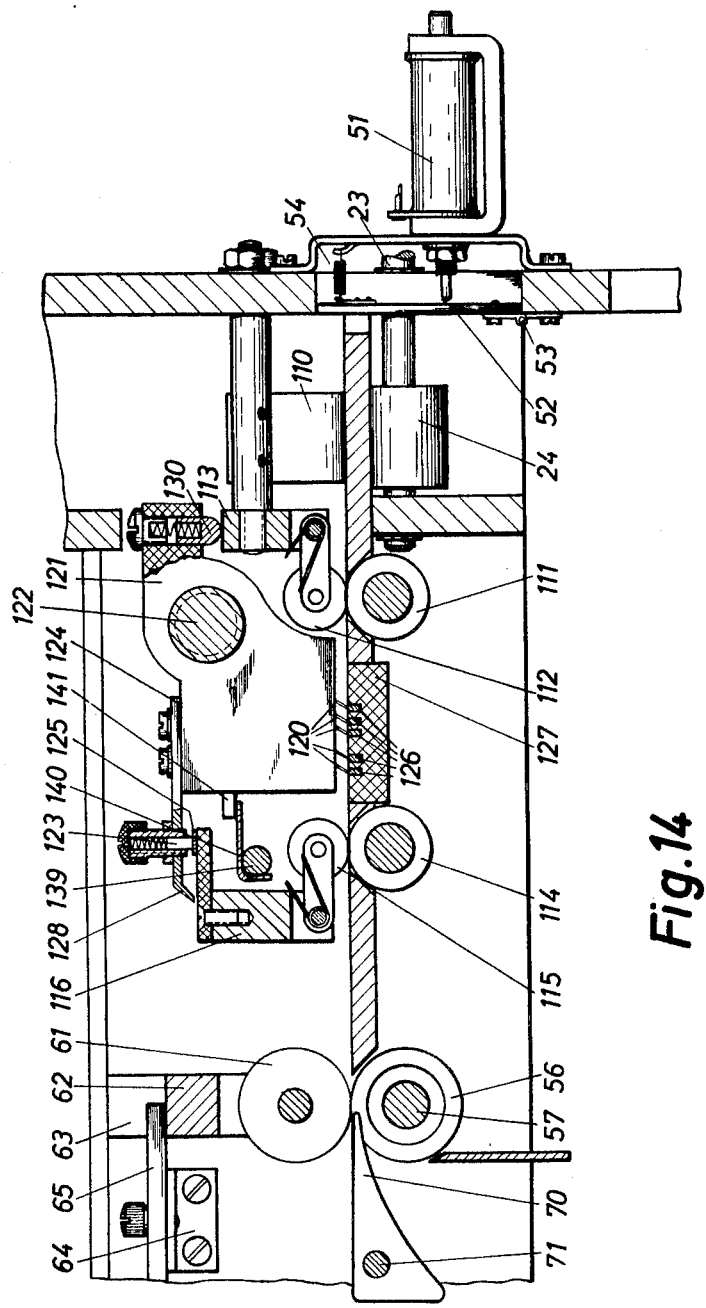
Figure 15:
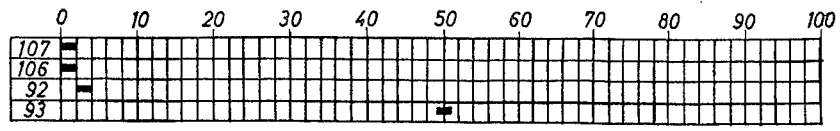

FIGS. 10a and 10b which are to be placed alongside of each other are a wiring diagram of the machine;

FIG. 11 illustrates a section through a second embodiment of the machine, this section corresponding approximately to the section shown in FIG. 6;

FIG. 12 shows on an enlarged scale the sensing device for the second embodiment of the invention;

FIG. 13 shows the locking device for the selected sorter column;

FIG. 14 is a section along the line 14—14 of FIG. 12;

FIG. 15 represents a time diagram for the second embodiment of the machine; and

Figure 16:
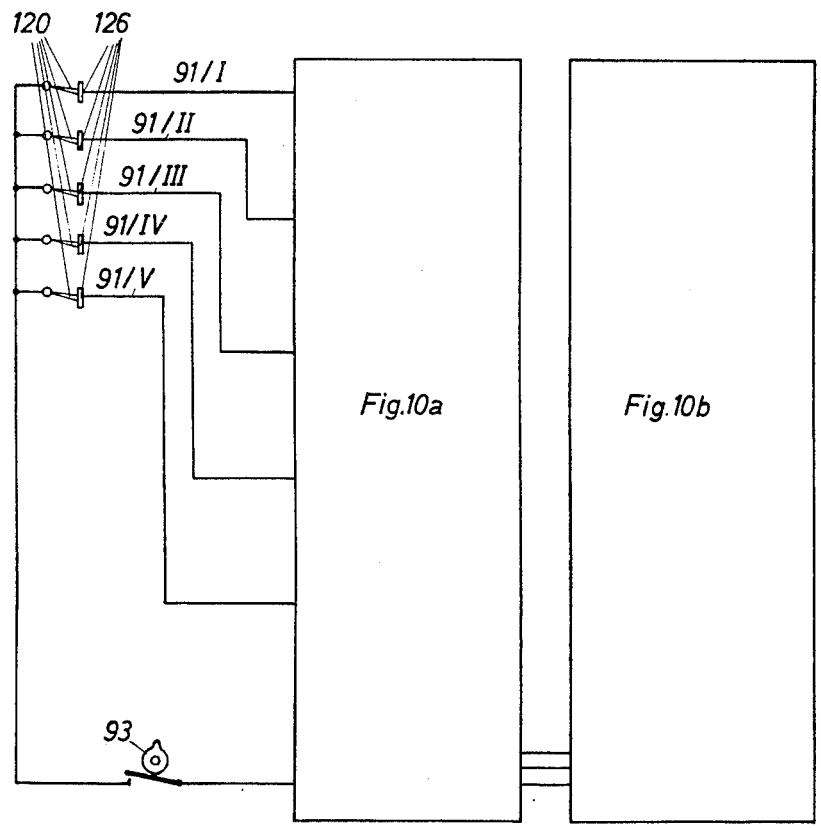

FIG. 16 is a wiring diagram for this second embodiment.

*First embodiment*

The first embodiment of the machine is shown in FIGS. 1 to 10a, 10b. From FIG. 1, it can be seen that the machine contains a feed bin 11 for the punched tape cards, and delivery bins 12 for the cards. In the embodiment, it is assumed that the punched tape cards may have a different length, namely, a length in full inches of between 6 and 24 inches and that on one inch of card length there are provided ten punched columns in the manner known in teleprinter tapes. It is furthermore assumed that the sorting concepts are located in the first fifty punched columns of each card, and that the selection of the sorting column in accordance with which sorting is to be effected is possible by plugging on a plug board 13.

The bottom-most card of a card stack is withdrawn from the feed bin in a manner which will be described below, in longitudinal direction by a knife drum and conducted in an S-shaped loop into the rerouting station. In front of the rerouting station, there is arranged the sensing device for the columnar sensing of the punched columns. The card is introduced into the rerouting station by longitudinal feed rollers, and when the card is completely in the rerouting station, the longitudinal feed rollers are raised and the card is moved away in transverse direction, and therefore with the long edge of the tape toward the front. Corresponding to the punched hole sensed, a sorting bin is opened, and the corresponding sorting flap remains open during an entire cycle so that the card can move within one cycle over the distance up to the sorting bin which is furthest away and thus at all times only a single card is in the sorting path over the sorting bins.

Figure 1:
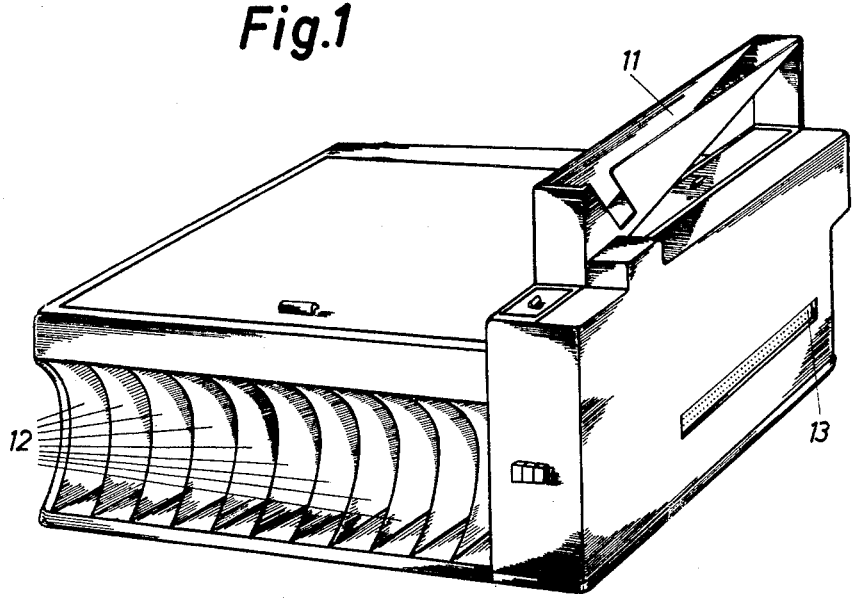
FIG. 1 is a perspective overall view of the machine.
Figure 2:
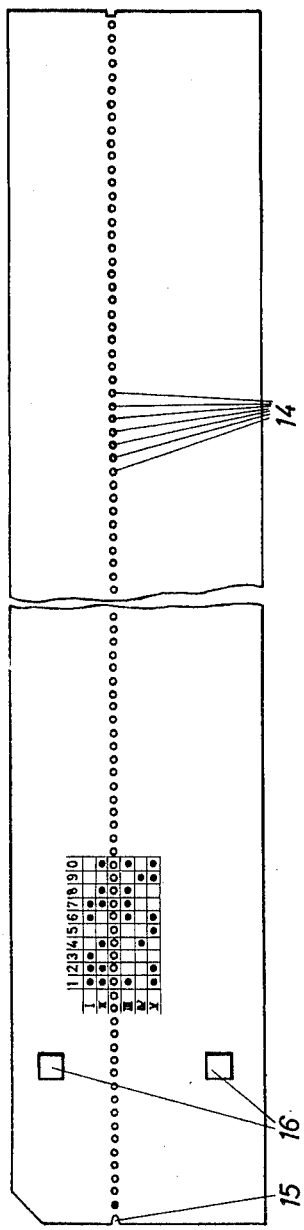
FIG. 2 shows a punched tape card on which, however, only the punch code is punched.

The punched tape card itself is shown in FIG. 2. It contains a centerline of conveyor holes 14 which serve to convey the punched tape card in a teleprinter or other machine. Aside from the known corner cut (top left), the punched tape card has a tongue-shaped cutout 15 which is necessary for introduction into the teleprinter. Furthermore, window cut-outs 16 are provided at the left end of the tape. They make it possible for the card conveyor knives to grasp the card and remove it from the stack.

In the actual operation, the punched tape cards naturally may also contain printing which is true also of the customary punched cards. The punched tape cards are in the present case punched in accordance with the International Teleprinter Code. In FIG. 2, there are indicated only the punched symbols for the ten digits 0 to 9 which are arranged within a five-unit channel (I to V). Of course a code having a sixth, seventh or eighth channel, a numerical safety code or some other code could just as well be used.

With the exception of the card knives for the removal of the bottom-most card from the stack of cards, the card conveyer is driven continuously. The card knives themselves are made active only at intervals by the single-revolution clutch which will be described below.

The motor (FIG. 5), via the belt 21, drives a worm shaft 22. The worms of the worm shaft 22 mesh in worm wheels which are located on the end of the shafts 23 for the drive rollers 24 (FIG. 6) which convey the cards into the rerouting staiton. The non-driven rollers 25 which are seated on resiliently supported toggle levers 26 rest against the driven rollers 24. On the right hand end of the worm shaft 22 (FIGS. 5 and 6), the rollers 25a and 26a are driven via worm wheels. On the end of their journals, however, there are seated spur gears by which the rollers 25b and 26b are driven in the manner which can be noted from FIG. 5.

The upper worm shaft 31 is driven from the righthand end of the worm shaft 22 (FIG. 5) via a spur gearing 30. This worm shaft, in its turn, drives via worms the feed rollers 32 (FIG. 6). By means of gears 29 (FIG. 5), the shaft 31 also drives the journals on which are seated the upper transport rollers 33 (FIG. 6).

The lower conveyer rollers 25 and the pair of conveyer rollers 32/33 of the upper card path are therefore continuously driven.

The withdrawal of a card from the bottom of a stack is effected by the card knives 34 (FIG. 6) of a rotating knife drum on which two narrow knives are so arranged that they fall into the window openings 16 of the card (FIG. 2) and can grasp the left-hand edge of said window openings. The card is advanced by the knives to such an extent that it comes between the first pair of transport rollers 35 (FIG. 6) of which only the bottom one is driven. On the journal of this lower transport roller, there is seated a spur gearing 36 (FIG. 5) which is driven via the gearing 37 also by the worm shaft 31 so that the lower roller 35 also rotates continuously. The drive wheel of a single revolution clutch 39 which can be disengaged by an electromagnet 40 is driven via a pinion 38 by the spur gear 36. When the electromagnet 40 is energized, the knives 34 make a revolution which, however, is uitlized only during a small angle of rotation in order to feed the card to the first transport rollers 35 (FIG. 6). The knives 34 then return into their initial position while the card is conveyed further by the rollers 35, the pairs of rollers 32, 33, as well as 25a/25b, 26a/26b and 24/25.

It is clear that the cards must be so inserted that the window openings 16 are above the knife drum bearing the knives 34 so that the left-hand edge of the card strikes in this case against the wall 45. Since the cards may be of different length, the right-hand ends of course do not coincide and the latter may possibly rest on an extendable support (not shown in the drawing) at the end of the feed bin 11.

In the rerouting station, the left edge of the card is moved until it strikes against the wall 46. The leading edge of each card is therefore in each case in the same position within the rerouting station. When the card has reached this position, a cam 47 (FIG. 6) strikes against the lever arm 48 which is turnably supported at its lower end and swings it in clockwise direction. The rod 49 which is connected with the lever 48 by a pin and slot connection moves in this way toward the right against the action of a spring connected to the left end (FIG. 6) of the rod 49. On the rod 49 there are seated bolts 50 (cf. also FIG. 8) which act on the toggle levers 26 so that upon the movement of the rod 49 to the right, the non-driven rollers 25 are lifted off from the card. The card therefore rests now freely on the rollers 44 which still rotate continuously.

After the lifting off of the rollers 25, a magnet 51 (FIG. 8) is energized. The armature of this magnet acts on a rocker 52 which is seated on a hinge at 53 and is held by the spring 54 in the position shown in FIG. 8. When the magnet is energized, its armature turns the rocker 52 in clockwise direction, and since this rocker 52 extends over the entire length of the card, the card is pushed to the right (FIG. 8) on the rollers 24 and fed to the transport rollers above the sorting bins.

Figure 9:
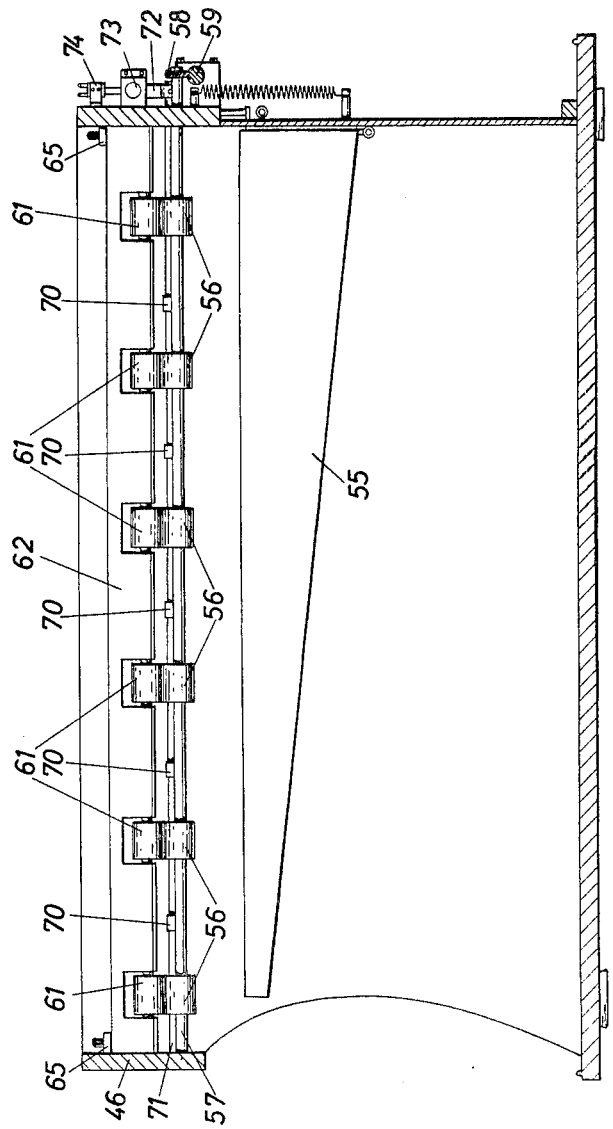
FIG. 9 is a section through a sorting bin, which shows the card feed carriage.

The sorter has ten sorting bins and a reject bin. In each bin there is provided in known manner a card carriage 55 suspended from a spring (FIG. 9). When a card leaves the rerouting station, it is first of all conveyed to its sorting bin (even when there is concerned the sorting bin furthest away) before the next card enters the path above the sorting bins. In order to convey the cards over the sorting bins, there are provided the driven rollers 56 which are seated on shafts 57. On the end of said shafts, there are provided worm wheels 58 which are driven by a common worm shaft 59 (cf. also FIG. 7). This worm shaft 59 is driven via the pair of bevel gears 60 (FIG. 5), the one bevel gear of which is seated on the worm shaft 22 and the other on the shaft 59. Since the shaft 22 is continuously driven, the transport rollers 56 rotate likewise continuously. Accordingly, the pressing rollers 61 (FIG. 9) above the sorting bins are also turned regardless of whether cards are in the path or not. Since the cards may be of different length and since this may even be true within a single stack of cards, the pressing rollers 61 must be developed as rollers which are independently resiliently supported on a support 62. If one therefore considers a single card, then the rollers 61 lying above the card are pressed somewhat upward, and the rollers lying along the extension of the card, rest on the corresponding rollers 56. The supports 62 extend over the entire depth of the machine, that is, over the entire card length up to 24″. They are guided in slots or grooves 63 (FIG. 8) in the side plates. On each side plate there is seated an angle member 64 to which there is firmly screwed a yoke 65 which holds the support 62 downward.

On each sorting bin there is provided a sorting flap 70 which is seated on a shaft 71. At the end of each shaft, there is seated outside the sidewall of the machine an angle member 72 (FIG. 7) on which the sorting magnet 73 can act. If the magnet 73 associated with a sorting bin is energized, the corresponding sorting flap 70 is swung in clockwise direction (FIG. 8) and the angle member 72 (FIG. 7) closes a contact 74. This contact is a holding contact for the associated sorting magnet so that after the magnet has once been energized the sorting flap remains open until the circuit of contact 74 is again opened. When the sorting flap 70 has been opened, the card which is on its way moves into the corresponding sorting bin and falls onto the carriage 55 (FIG. 9). Since the head ends of the cards are resting against the wall 46 (FIGS. 6 and 9) and since this wall lies on the left-hand end (FIG. 9) of the carriage 55, the head ends of the cards in the sorting bins all rest one above the other on the card removal side of the machine (front side in FIG. 1).

The cards can then be removed in customary manner and sorted in accordance with the next card column.

On its path to the rerouting station the card passes by a row of brushes comprising five sensing brushes 80 which are located one behind the other in FIG. 6 so that only the frontmost of them can be noted. This row of brushes therefore senses the cards column-wise, one after the other, in which connection, however, all five channels are sensed simultaneously. The selection of the column in accordance with which sorting is to be effected must therefore be effected in synchronism with the passage of the columns past the row of brushes 80. For this purpose, there is provided a selector switch for selecting the desired sorting column. From the worm shaft 22 (FIG. 5) there is driven, via a worm wheel 81, the spur gear 82 which is connected with the latter. The wheels 81/82 are seated on the shaft 83. The gear 82 drives a spur gear 84 on which there is seated the follower (not shown) which senses the switch blades 85. The transmission ratios are so selected that for one revolution of the shaft 83, there are five revolutions on the gear 84 and of the corresponding wiper. Of these five revolutions, however, only the first revolution is made electrically active and during this one revolution as already mentioned at the start, 50 punch columns pass the row of sensing brushes 80 (FIG. 6). Aside from the 50 selector blades, there are also provided two blank blades so that the entire cycle corresponds to the movement of 5×52=260 punched columns, 240 parts thereof devolving on the movement of the card, and 20 parts of the machine cycle on the remaining switching processes, such as changing direction in the rerouting station, etc. Depending on the desired sorting column, one of the blades 85 is plugged to the plug board 13 (FIG. 1) and in this way the sorting brushes 80 enter into action, in a manner still to be described, at the moment when the selected sorting column passes said brushes.

The command for the start of a new cycle is obtained from the shaft 83 (FIG. 6). On this shaft there are seated the six pulse disks which are described further below in connection with wiring diagram and which determine the course of the cycle. One of these pulse disks determines the connecting of the magnet 40 (FIG. 5) of the single-revolution clutch, whereby a new cycle starts.

The overall operation can be noted from the following description of the wiring diagram and of the time diagram.

First of all, the sensing process and the control of the sorting magnets will be described.

In FIG. 10a, there can be noted the sensing brushes 80 which are connected together by a line 86 which leads to the fifty jacks of the plug board 13. The opposite jacks lead to the blades 85 of the selector which is read out by the wiper 87 (not shown in the mechanical showing) synchronously with the passing of the first fifty punched columns of the card by the row of brushes 80. The plug bridge must be set in accordance with the sorting column desired. The brushes 80 sense the punched combination upon the passage of the punched column selected. By means of a contact pyramid translator known per se, the result of the sensing is translated, in a manner which will be described further below, into a single character which corresponds to the digital meaning of the punched combination sensed. The ten sorting magnets are connected to the outputs of the contact pyramid translator. When a sorting magnet is energized, it keeps a sorting flap open until the end of the cycle and the sorting magnet which has been adjusted is de-energized at the end of the cycle. In the pause between successive cycles, the excitation of the sorting magnet is extinguished by the closing of the cam 105 (see also FIGS. 3 and 10b), since the holding circuits of the sorting magnets are interrupted. Thereupon the transfer of the translator setting is effected by the cam 104 to the selected sorting magnet 73 which holds itself over its holding contact 74. Thereupon the translator is extinguished by cam 92 (FIG. 10a) so that it is again free for adjustment in accordance with the results of the sensing of the next card (lines 85 and 93 in the time diagram). Therefore, while the translator is adjusted by a card, a sorting flap is opened, corresponding to the results of the sensing in the preceding cycle.

If a punched hole is present in the card, the brushes lie on contact pieces 89. If contact is made on a brush 80, the associated translator relay (90/I to 90/V) is energized by a current pulse. Since in the present case the same arrangement ils provided five times (for instance relays 90/I to 90/V corresponding to the five brushes 80 and the five punched positions of the card), the arrangement will be described in detail only once. From the contact 89, a line 91/I leads to the bistable multivibrator, known per se, which is shown in the drawing. When the latter receives a pulse via the line 91/I, the translator relay 90/I (ahead of which is connected a power transistor) is for the time being energized. Only when the contact pyramid translator is to be erased, is the contact associated with the cam 92 closed, and all bistable multivibrators receive a second pulse whereby they tip back into the starting position and the translator relays 90 deenergize. None-set multivibrators, however, can not be brought into another position by the erasing pulse, since this pulse is fed only to the base of that transistor which is not responsible for the response of the relay 90.

As already mentioned, the cam contact 93 is closed only during a part of the cycle, namely, only for the time that the first 52 punch columns pass the senser row 80.

Contact pyramid translators are known per se in many types and therefore need not be described in detail. In FIG. 10b, the translator relays 90/I to 90/V are indicated in dotted line and directly below these delays there are shown the contacts controlled by each relay, which contacts are placed into alternate positions upon the excitation of the respective relays. With the punching code shown in FIG. 2, the sorting magnets 73 are energized, in accordance with the meaning of the punching, when the setting of the translator is transmitted to the sorting magnets. If a sorting magnet is energized, it closes a holding contact 74 in the manner described.

The electrical manner of operation will now be described briefly.

By means of the main switch 94 (FIG. 10b), the machine is connected to the power lines and the motor 20 starts. By a known rectifier device, two D.C. currents having for instance the potentials indicated in the drawing are produced, namely, on the one hand a circuit consisting of the main lines 95 and 96 and on the other hand a circuit having the main lines 97/98. Upon depression of the starting key 100, the relay 101 is energized and connects the control device over its contacts 109a and 109b. The relay 101 holds itself via the holding contact 102 until the stop key 103 is actuated. The circuit of relay 101 is interrupted in this way, and the control device is again made inactive.

Figure 3:
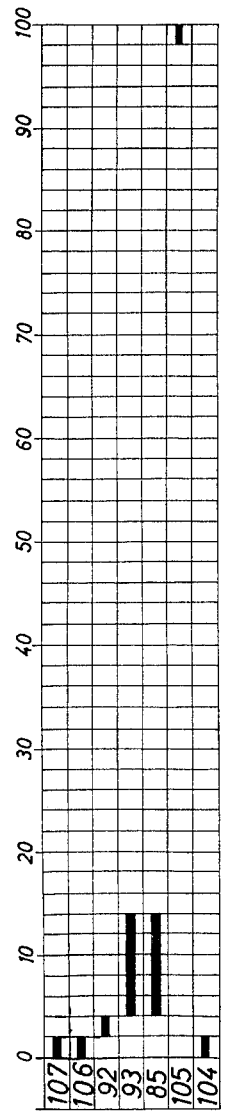
FIG. 3 represents a time diagram of the machine.
Figure 4:
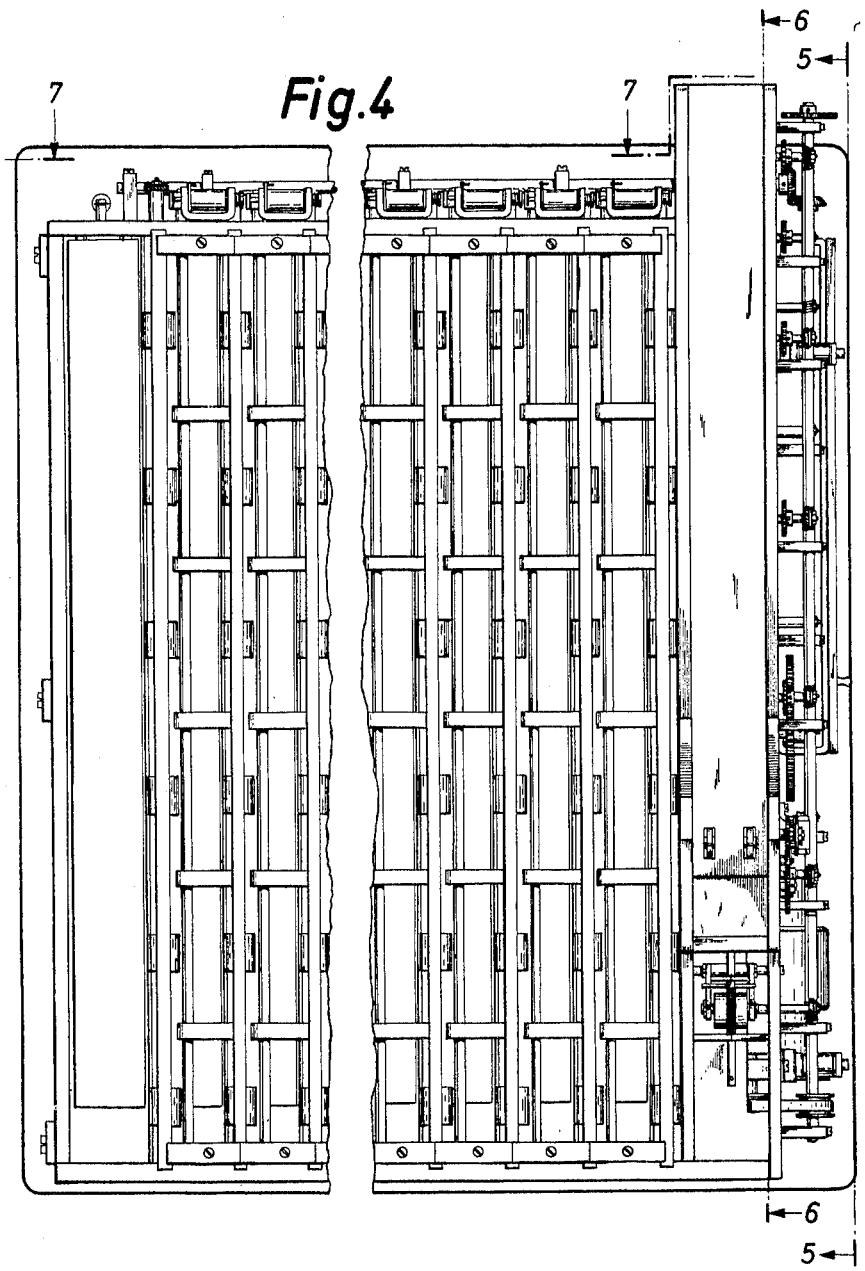
FIG. 4 shows a top view of the machine, with the cover lying above the sorting bins removed; reference numerals have intentionally been omitted here in order not to interfere with the clarity of the drawing, and since the individual machine parts and their connection with the overall showing is sufficiently readily understood from the other figures.
Figure 5:
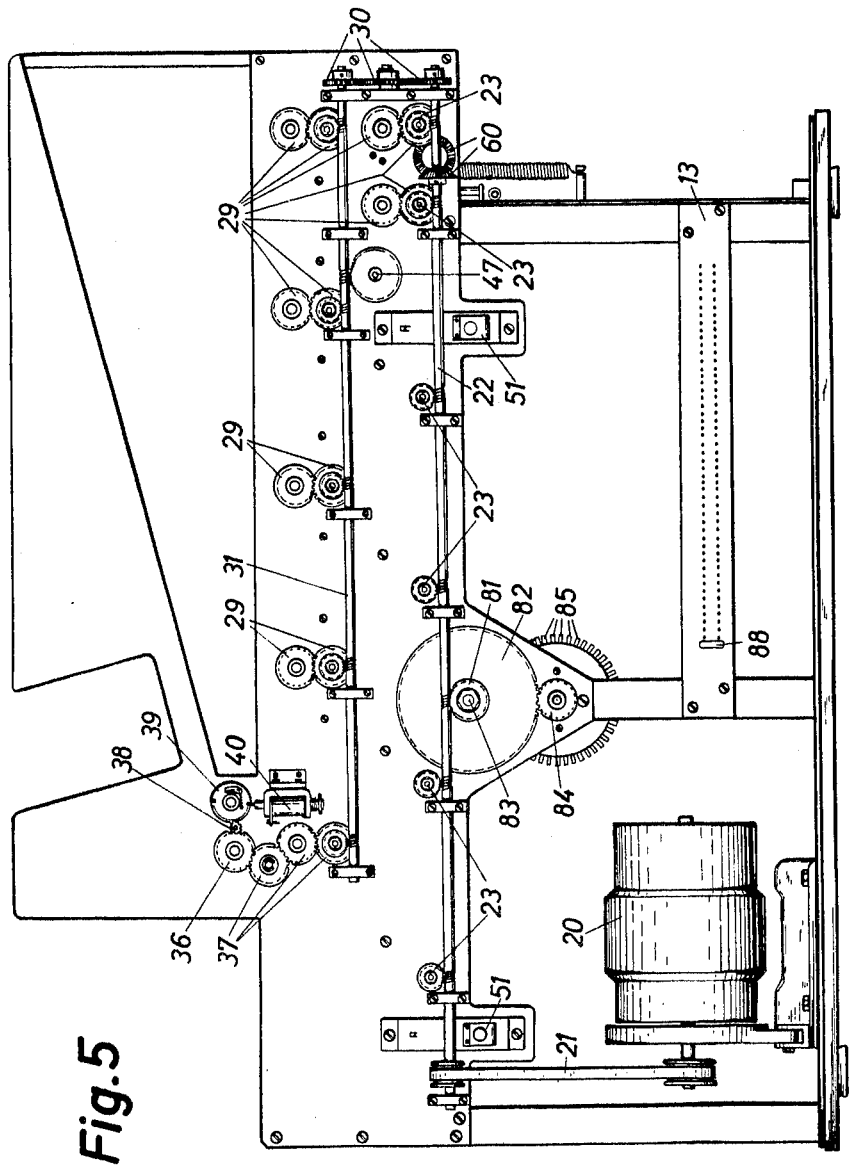
FIG. 5 is a side view of the machine, as seeen along the line 5—5 of FIG. 4.

The cams 104, 105, 106, 107, 92 and 93 are all seated on the shaft 83 described above and control the contacts associated with them in accordance with the time diagram shown in FIG. 3. The cam 105 opens its contact at the end of each cycle and thereupon cancels the sorting magnets 73. The cams 107, 106 and 104 with their corresponding contacts become active simultaneously at the start of each cycle, the cam contact 107 actuating the magnet 40 of the single-revolution clutch 39; the cam contact 106 brings in the two magnets 51 of the transverse transport mechanism and the cam contact 104 takes care of the transfer of the value sensed from the punched tape card and stored in the pyramid translator, to the corresponding sorting magnet. The cam contact 92 gives a pulse to all multivibrators so that they flip back into their starting position and thus erase the stored value in order to be free for the following card to be sensed. The cam contact 93, as already mentioned, places the commutator 85 in operation when the first fifty punched columns pass the sensing brushes.

There are three cycles from the feed bin to the delivery bin. During the first cycle, the front edge of the card travels from the feeding bin to in front of the sensing station; in the second cycle, the card passes through the sensing station to the end of the rerouting station, that is, to the wall 46 (FIG. 6); in the third cycle is effected the transverse transportation into the corresponding sorting bin. If the single-revolution clutch is actuated by the corresponding magnet 40 by means of the cam contact 107 and a new punched tape card is pulled out of the magazine, the preceding card is at the same instant in the S-shaped card path while the card preceding it is at the same time in the rerouting station; simultaneously with the removal of a card from the magazine, the transverse transport starts as a result of the excitation of the two flap magnets 51 (by the cam contact 106). (As will be presently explained, the card—due to the gap in the stream of cards—is already out of the rerouting station when the next card enters it.) Simultaneously therewith, the corresponding sorting bin magnet is also energized by the cam contact 104, as can be noted from the time diagram of FIG. 3.

While this card is now transported into its corresponding sorted bin, the following card is at the same time sensed, but before this all relays 90/I to 90V are brought into their normal position by the cam contact 92. While this card is now sensed, and thus passes into the rerouting station, the preceding card has reached its sorting bin and the sorting flap can drop again, which is done by actuation of the cam contact 105. The card withdrawn from the magazine is now located in S-shaped card path, the preceding card is in the rerouting station and the card preceding the latter in the delivery bin. The cycle thus starts all over again.

Between two successive cards, there is a gap of about two inches, depending on the conditions selected. The speed relationship between longitudinal transport and transverse transport are so selected that the card is already out of the rerouting station before the preceding edge of the following card enters the rerouting station.

Instead of the commutator or selector 85/87, there can also be used a known electronic counter which is stepped forward by the transport holes of the punched tape card which are associated with each card column. It is set to the number of explorations corresponding to the desired sorting column, and upon the reaching thereof the sorting sensers are made active.

Second example

The second example of the invention is shown in FIGS. 11 to 16, but only insofar as it differs from the first embodiment. The removal of the punched tape cards from the stack in the magazine is effected in the same manner as in the case of the first embodiment by the rotating knife 34 and the pairs of rollers 32/33 up to the curve of the path lying at the right-hand end (FIG. 11) where the card is introduced into the rerouting station by the rollers 25a/25b, 26a/26b. In this second embodiment, however, there are no sensing brushes between the rollers 25a/25b, 26a/26b.

The rerouting station is also constructed somewhat differently than in the case of the first embodiment. There are provided the lower transport rollers, as in the case of the first embodiment, but the upper transport rollers which cooperate with the rollers 24 are absent. Instead of the upper transport rollers, there are provided springs 110 which rest against the transpot rollers 24 and wipe against them. If a card is fed through the pair of rollers 26a/26b, it is conveyed further by the lower rollers 24, the springs 110 wiping lightly on the card. The advance of the card toward the left (FIG. 11) is effected until the front edge of the card strikes against wall 46. When the card has arrived in this position, the magnet 51 (FIG. 14) enters into action in the same manner as in the case of the first embodiment, and the rocker 52 pushes the card toward the left by acting on the entire length of the wide side of the card. As a result, the card slides between the springs 110 and the rollers 24 until it is gripped by intermediate rollers 111. On the latter, there resiliently rest the pressing rollers 112 which are supported on a support 113. The pressing rollers 112 which are of a length somewhat less than an inch, are arranged alternately at distances of one inch apart so that for card lengths of any desired number of whole inches between 6 inches and 24 inches, the rollers 112 are in each case individually raised. The roller arrangement 114/115 with the roller support 116 is constructed in similar manner.

When the card is pushed toward the left (FIG. 14) by the rocker 52, it is first conveyed further by the rollers 111/112, passes below the sensing brushes 120 described below and is then gripped by the rollers 114/115 and finally conveyed by the following rollers 56/61 into the sorting bins in the same manner as described in connection with the first embodiment. The card is moved with uniform speed from the rollers 111 below the brushes up to its sorting bin. The transport from the rerouting station to the last sorting bin corresponds to one cycle. As the result of the spacing of two inches between consecutive cards and the high speed of removal from the rerouting station, this card is therefore already out of the rerouting station before the front edge of the next card enters the rerouting station. It is clear that in contradistinction to the first embodiment, the sensing, translator setting, sorter-switch control and the cancelling of these electric properties takes place in each case within a single cycle so that no transfer of the translator setting to the sorting magnets between two successive cycles is necessary.

The five sensing brushes 120 (FIG. 14) are seated on a brush support 121 which can be adjusted in known manner in longitudinal direction of the card, by a spindle 122 (cf. also FIG. 12), to the desired card column. The brushes 120 are electrically connected and are connected to the resiliently supported carbon 123 which is seated on a holder 124. The carbon 123 wipes against a contact bar 125 which is seated on the holder 116 and extends over the entire width of the card path and forms the current feed to the carbon. The brushes 120 can, upon the setting of each desired column, make contact with their associated contact bars 126. The contact bars 126 are positioned in an insulating strip 127 which extends between the two sides plates of the machine.

The holder 124 for the carbon brush 123 is developed at its front end as a pointer 128 which moves over a scale 129 (FIG. 12). In order for the sensing brushes 120 (FIG. 14) to be pressed with slight resiliency against the contact bars 126, a spring is provided which is supported on a pin 130 which rests against the transverse bar 113. As a result of the arrangement shown in FIG. 14, the brush support is pressed slightly in counterclockwise direction.

If the set of brushes is to be adjusted to a different punched column, it is necessary to lift it first of all from the bars 126 before the spindle 122 is turned. For a given column setting, the spindle is secured against rotation. For this purpose, there is arranged outside the sidewall of the machine on the outer end of the spindle a notched wheel 131 (FIG. 13), in the notches of which is engaged a pawl 132. The adjustment of the spindle can be effected by means of the handcrank 135 which is seated firmly at its outer end. When the set of brushes is to be adjusted, the operator must first of all depress the key 136 which is held upward by spring atcion. Upon the depression of this key, the pawl 132 is lifted out of the notch via the double-armed lever 137, the right end (FIG. 13) of which is seated on a pin 138 of the pawl 132. The double-armed lever 137 is seated on the outer end of a shaft 139, to which there is fastened over its length within the card path a angle member 140 (FIGS. 12 and 14). On this angle member 140, there rests a projection 141 of the brush holder 121. Accordingly, when the key 136 (FIG. 13) is depressed, the projection and thus also the brush holder are pressed upward by the angle 140 and the setting of the brush holder can be effected by turning the crank 135 without the brushes wiping on their base. The projection 141 wipes of course over the angle member 140.

The manner of operation of the second embodiment is as follows, as can be noted from the wiring diagram and the time diagram (FIG. 15):

A full cycle—as already mentioned—is provided for the conveying of the cards from the rerouting station through the sensing device to the last sorting bin. Therefore, there is in this case also at all times only a single card in the sorting path.

Instead of sensers whose position in space can be changed, there can also be provided, in known manner, for each individual punched column, a sensing device, each of which can be selected by plugging. The sensing device can in this connection comprise for each column a plurality of brushes or else only a single brush. In the latter case, this brush is in known manner, corresponding to the passage of the individual punch positions of the column past the brush, connected by a selector switch successively to the translator relays. The wiring diagram is merely indicated schematically in FIG. 16, since it agrees to a far-reaching extent with FIGS. 10a, 10b. In the boxes of FIG. 16 which are designated 10a and 10b, there is contained precisely the same wiring as within the dashed-line border in the drawings 10a and 10b, but with the following difference: In FIG. 10b, the holding contacts 74 are eliminated since the translator contacts of relays 90/I to 90/V have connected the selected sorting magnets during the corresponding cycle. Accordingly, the cancelling contact of the cam 105 which serves to interrupt the holding circuit of the sorting magnets is also dispensable. The contact of cam 104 also is superfluous since there is no transfer between two cycles.

The essential difference between the second embodiment and the first is that the punched tape cards are sensed during the transverse transport. As a result, there is also eliminated (as shown in FIG. 16), the selector switch or selector commutator 85 (FIG. 10a) and the plug device 13. Furthermore, the shape of the cam 93 is changed. While in the first embodiment of the cams 93 (FIG. 10a), its contact closes for a longer period of time, namely, until the selector 85 has made one revolution, the cam 93 (FIG. 16) in the second embodiment closes its contact only for a short time for a pulse to the sensing device, when a punched tape card is precisely below the brushes. The respective translator relays 90/I to 90/V (FIG. 10a) are in this manner operatively set.

Changes may be made within the scope and spirit of the appended claims which define what is believed to be new and desired to have protected by Letters Patent.

I claim:

1. Sorting machine for data media provided with punched markings, having a sensing device which can be adjusted to a desired sorting column, and under the monitoring of which the data media are introduced into the sorting bin corresponding to the marking sensed, wherein the recording media are made in the form of punched tape cards, which are relatively narrow with respect to their length, and may be of different tape lengths whereby the longest tape length may be a multiple of the shortest tape length, comprising an inclined magazine in which the stacked cards lie, irrespective of length with one corresponding narrow side of each card in alignment, means for drawing each card therefrom with such narrow side leading from the stack of cards, card conveying means operative to conduct such cards to delivery bins, said conveying means including a generally S-shaped portion in which the cards are received from the magazine, reversely rerouted through an angle which is less than 180° by substantially the angle of inclination of said magazine, and then reversely rerouted through an angle of substantially 180°, said delivery bins having a width to accommodate the narrow dimension of the cards and being arranged to support the punched tape cards is stacked arrangement, even in case of different tape length, with such narrow edges, which were leading during the withdrawal, above each other, the bins being so arranged that said narrow edges lie in a common plane with respect to each other both in each individual bin and also in the different bins.

2. Machine according to claim 1, comprising in further combination, a stationary sorter sensing device, common to the columns, so disposed that the punched tape cards, upon their longitudinal conveyance, pass by said stationary sorter sensing device whereby they can be sensed column-wise by the latter, and means for effecting the selection of the sorting column by the pre-settable time-dependent actuation of the sorter sensing device.

3. Machine according to claim 1, wherein said card conveying means comprises a longitudinal conveying device in which the punched tape cards are conducted with their narrow side forward for such a distance into a rerouting station that the preceding narrow edge of each card passes in each case into the same position independently of the length of tape, a transverse conveying device, and means for feeding the punched tape cards from the rerouting station with their long side toward the front to said transverse conveying device which conveys them to the individual sorting bins so that the head ends of the cards lie in alignment in the sorting bins at the card removal side of the machine independently of the length of the individual cards in a sorting bin.

4. Machine according to claim 3, wherein the sorter sensing device is arranged between the rerouting station and the sorter bins, and the sensing of the selected sorter column takes place during the transverse transport of the card.

5. Machine according to claim 4, wherein the sorter sensing device which is arranged in back of the rerouting station and provided only for a single punched column, is adjustable in position in longitudinal direction so that it can be adjusted to any desired card column.

6. Machine according to claim 4 wherein there is provided in back of the sorting station in the longitudinal direction of the card, a row of sorting sensers each having a sorter sensing station per punched column, each of which sorter sensing stations comprises at least one sensing member, each having one senser per punch position of a punched column.

7. Machine according to claim 3, wherein said rerouting station comprises a row of pairs of rollers arranged one in back of the other in the longitudinal direction of the punched tape card, the lower rollers of each pair of which are driven, and the upper, non-driven rollers of each pair are pressed resiliently against the driven rollers, that the pressing rollers are lifted at the time of rerouting of the card by a common lifting member, and that the card is thereupon imparted a movement perpendicular to its longitudinal direction by a pusher which acts on the longitudinal side of the card, whereby the card passes into the first conveyer rollers of the sorting path arranged above the sorting bins.

8. Machine according to claim 3, wherein said rerouting station comprises a row of driven conveyer rollers arranged one in back of the other in the longitudinal direction of the punched tape card and below the same and that the card is held against said rollers by leaf springs arranged above the card and is conducted with its head end against a stop by said rollers, and that the card is thereupon imparted a movement perpendicular to its longitudinal direction by a pusher which acts on the longitudinal side of the card, whereby the card passes into the first conveyer rollers of the sorting path arranged above the sorting bins.

9. Machine according to claim 2, wherein said transverse conveying means is arranged above the sorting bins and comprises continuously driven lower rollers and non-driven pressing rollers which are pressed resiliently against the lower rollers, and coaxially located pressing rollers individually supported under spring action so that in case of cards of different length, the pressing rollers can individually adapt themselves to the specific length of card.

10. Machine according to claim 3, wherein said means for drawing the card from the magazine comprises a card advancing gripper in the magazine which is controlled by a single-revolution clutch, and conveys the front end of the card only up to the first pair of rollers which pulls the card with increased speed out of the magazine, the card being then conveyed further in the longitudinal conveyance path with the same increased speed.

11. Machine according to claim 3, wherein the means for the card advance from the magazine is effected by card knives which carry out a rotary motion, and which enter into window cut-outs of the punched tape card and by striking against the one side of the window opening, remove in each case the lowermost card from the stack of cards.

References Cited by the Examiner

UNITED STATES PATENTS

| | | | |
|---|---|---|---|
| 2,720,360 | 10/1955 | Luhn | 235—61.7 |
| 2,919,917 | 1/1960 | Worswick | 209—110 X |
| 2,990,956 | 7/1961 | Wilson | 209—110 |
| 2,995,240 | 8/1961 | Cunningham | 209—74 |
| 3,000,519 | 9/1961 | Purnell | 209—74 |
| 3,024,980 | 3/1962 | Droege | 209—110 |
| 3,069,012 | 12/1962 | Johnston | 209—110 |

M. HENSON WOOD, JR., *Primary Examiner.*

ROBERT B. REEVES, ERNEST A. FALLER,
*Examiners.*